April 4, 1967   D. P. BUSHNELL   3,312,518
BINOCULARS HAVING HIGH AND LOW MAGNIFICATION LENS SYSTEMS
AND COUPLED SELECTIVE SHUTTERS
Filed Sept. 6, 1963                         2 Sheets-Sheet 1

United States Patent Office 3,312,518
Patented Apr. 4, 1967

3,312,518
BINOCULARS HAVING HIGH AND LOW MAGNIFICATION LENS SYSTEMS AND COUPLED SELECTIVE SHUTTERS
David P. Bushnell, Altadena, Calif.
(2828 E. Foothill Blvd., Pasadena, Calif. 91107)
Filed Sept. 6, 1963, Ser. No. 307,043
3 Claims. (Cl. 350—37)

The present invention relates to semi-zoom binoculars and more particularly to binoculars having a high power lens system on one side and a low power lens system on the other side.

It is common practice today to provide binoculars having either a low magnification and wide field of vision or a high magnification and a narrow field of vision. Up to the present time it has been possible, using the former of these binoculars, to observe an object in a wide field, but it has not been possible to see the object more clearly or at a greater distance. Conversely, when looking through the latter type binocular, it is impossible to obtain a broad field of vision where such is desirable, e.g., at a football game. Where it has previously been attempted to obtain transfer from one type to another, such as by switching the two types of binoculars, this change has been too slow for desirable viewing. The present invention provides a device which makes such a change quickly and easily so that a moving object may be constantly retained in sight. The present invention is particularly useful for look-out men, such as on ships, who must first scan a wide area and must then, upon sighting an object at a far-off distance, quickly observe the object more clearly under high magnification. In the case of opera glasses, it is desirable that the spectator observe the whole stage with a glass having a wide field of vision and then, if desired, observe the facial expressions of particular actors by increasing the magnification.

It is, therefore, an object of the present invention to provide a semi-zoom binocular device.

It is another object of the present invention to provide a binocular having a high power and narrow field on one side and a low power and wide field on the other side.

It is yet another object of the present invention to provide a binocular which may quickly and easily have its field and magnification changed.

It is yet another object of the present invention to provide a binocular which is simple and economical to construct and to use.

These and other objects and the nature and advantages of the instant invention will be apparent from the following description taken in conjunction with the accompanying drawings, wherein.

Figure 1:
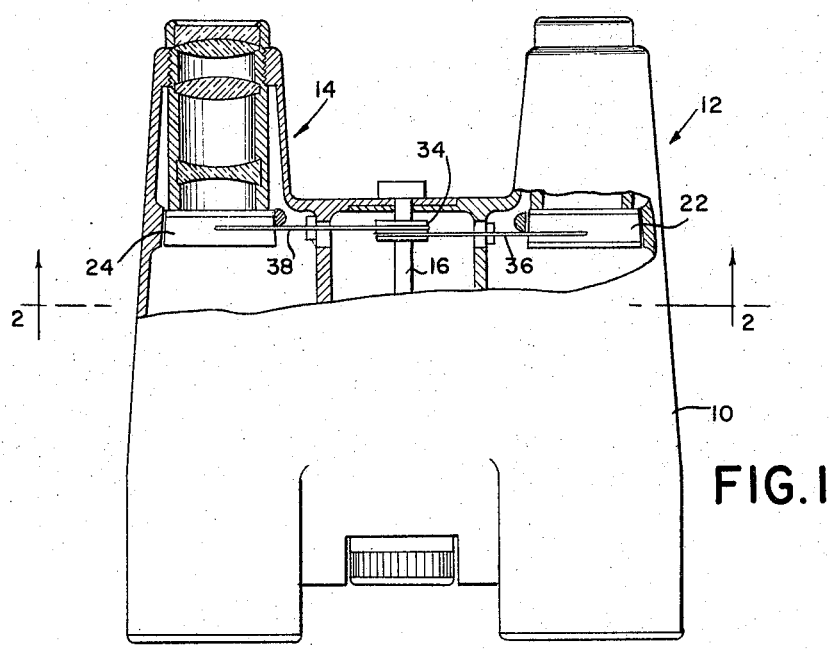
FIG. 1 is a plan view of one embodiment of the binocular of the present invention, partly in section.

The device in general comprises a binocular casing 10, a low-power, wide-field lens system 12 on one side and a high-power, narrow-field lens system 14 on the other side. The device is provided with a shutter system to close one lens while opening the other either simultaneously (FIGS. 1 and 2) or independently (FIG. 3). Lens system 12 may, for example, be provided with a magnification of 4× or 5× while lens system 14 may be provided with a magnification of 8× or 10×.

Casing 10 is constructed in two sections (as is conventional), corresponding to a casing for each lens section 12 and 14. Between the two casings is provided a shaft 16 about which the two casing sections may be pivoted to accommodate for varying distances between different pairs of eyes.

Each lens section, 12 and 14, is provided with a shutter 18 and 20, respectively. These shutters are carried by shutter rings 22 and 24, respectively, which are adapted to rotate within their respective housings to effect opening and closing of the shutters 18 and 20. Shutter ring 22 is provided with a pinion section 26 and rotation is effected by rack 30. Similarly, rack 32 in section 14 effects rotation of shutter ring 24 through its pinion section 28. Racks 30 and 32 are located at one end of rods 31 and 33, respectively, which pass through the casings and are provided with caps 35 on the end thereof outside of the casings. In the FIG. 3 embodiment, each shutter ring is rotated independently of the other by effecting linear movement of its mating rack.

Figure 2:
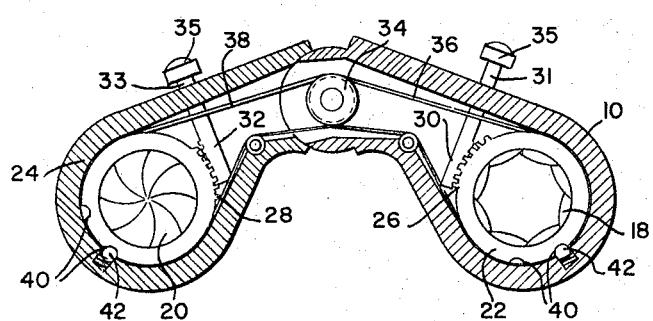
FIG. 2 is a section taken along line 2—2 of FIG. 1.
Figure 3:
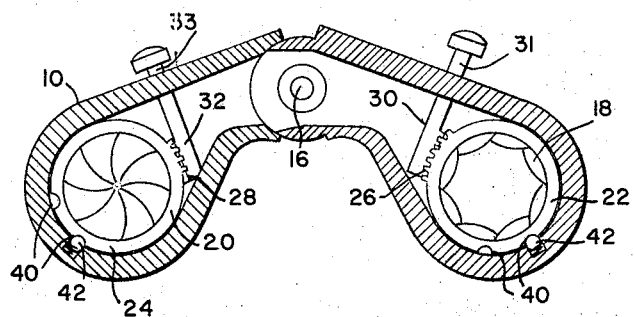
FIG. 3 is a section similar to FIG. 2 showing another embodiment.

In the preferred embodiment of FIGS. 1 and 2, the central shaft 16 is provided with a freely rotatable pulley 34 which carries elastic belts 36 and 38, fixedly connected to the shutter rings 22 and 24, respectively. Thus it is seen in FIG. 2 that when rack 32 is pushed downwardly, shutter ring 24 rotates clockwise to close shutter 20; and simultaneously force is transmitted through elastic belt 38, pulley 34 and elastic belt 36 to effect simultaneous clockwise rotation of shutter ring 22 which opens shutter 18. When it is desired to close shutter 18 and open shutter 20, it is necessary only to depress rack 30 which effects counter-clockwise rotation of both shutter rings.

Each shutter ring is provided with a pair of notches 40 about its outer periphery. A spring biased ball bearing 42 is provided in each casing to mate with the shutter ring notches to provide stops against undesirable rotation of the shutter rings. The notches 40 are provided at the positions of ring rotation corresponding to the shutters being fully open and fully closed.

In use, the wide angle low magnification eyepiece is first used by depressing rod 33, which closes shutter 20 and opens shutter 18, rod 31 being raised to its upward position. When greater magnification is desired, the rod 31 is depressed, thus closing shutter 18 and opening shutter 20, with rod 33 being raised.

In the modified form of the invention shown in FIG. 3, the rods 31 and 33 are actuated independently of the other so that if desired, both shutters can be open simultaneously.

Figure 4:
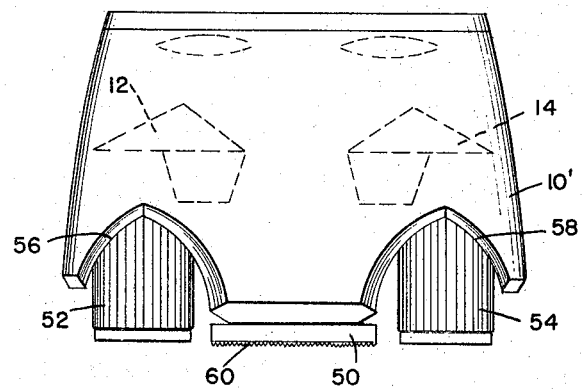
FIG. 4 is a plan view of another embodiment of the present invention.
Figure 5:
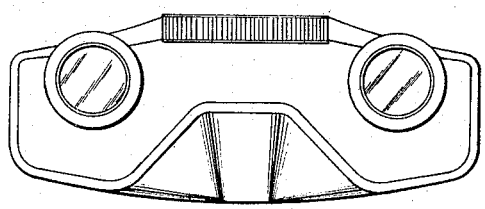
FIG. 5 is an end view of the FIG. 4 embodiment looking at the back of the binoculars.
Figure 6:
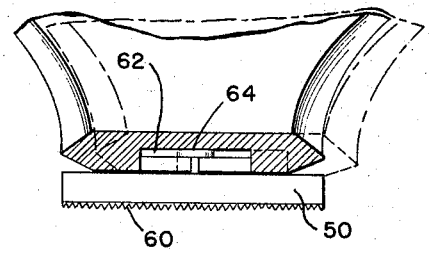
FIG. 6 is an enlarged partial view partly in cross section showing the means for shifting the binoculars of FIG. 4.

The embodiment of FIGS. 4–6 provides a simplified semi-zoom binocular comprising a one-piece casing 10'. Eyepieces 52 and 54, for lens systems 12 and 14, respectively, are set in at indentations 56 and 58 and project toward the front end of the binoculars just short of a plane defined by the front end of plate 50. Thus plate 50 may rest against the forehead without causing eyepieces 52 and 54 to project into the eyes.

A greater distance is provided between the eyepieces 52 and 54 than is normal for the distance between a person's eyes. Thus, if a person lines his left eye against eyepiece 52 in order to see through the low-power, wide-field lens system 12, his right eye will not line up with eyepiece 54 and will be blanked off by an opaque part of the binocular. To then see through eyepiece 54 and lens system 14, he need only move the binocular casing horizontally to the left with respect to the plate 50 until his right eye lines up with eyepiece 54. In order to maintain the binocular in proper position, plate 50 and casing 10' are adapted to shift laterally with respect to one another. Plate 50 is provided with a corrugated surface 60 which grips the skin of the forehead and anchors the plate 50 to permit relative lateral shifting of the casing 10'. As shown in FIG. 6, a slot 62 is provided in the casing 10' adjacent to the plate 50 and a knob 64 is provided attached to the plate 50 adapted to slide in the slot 62. Of course other mechanical connections between the plate 50 and casing 10' are contemplated, so long as relative movement of about 1 cm. is provided between the parts.

The embodiment of FIGS. 4–6 is very inexpensive and simple to produce, since the casing is made of only one piece and need not be hinged. Moreover, no shutter mechanism is required in this embodiment.

The semi-zoom binoculars of the present invention provide many advantages over a true zoom system. A true zooming system, such as used in movie cameras, has a smaller field of view and poorer resolution due to the various compromises having been made to permit a variable focal length in only one lens system.

It will be obvious to those skilled in the art that various changes may be made without departing from the spirit of the invention and therefore the invention is not limited to what is shown in the drawings and described in the specification, but only as indicated in the appended claims.

What is claimed is:
1. A binocular device comprising
   a casing,
   a first viewing means in one section of said casing having a lens system providing low magnification and wide-field,
   a second viewing means in another section of said casing having a second lens system providing high magnification and narrow-field,
   control means to simultaneously open one of said viewing means and close the other of said viewing means,
      said control means including
         shutters for each of said viewing means,
         a ring about each of said shutters,
         a pinion means on each of said rings,
         rack means mating with each of said pinion means to effect rotation of each of said rings upon linear movement of said rack means,
         each of said rack means having a portion extending outwardly and generally at right angles to its casing section and positioned so that inward pressure causes operation of said shutters,
      said control means further including
         belt means connected to each of said rings to effect simultaneous opening of one shutter and closing of the other upon inward pressure of said extending portion of one of said rack means.
2. A device in accordance with claim 1 wherein
   said rings have notches therein,
   and spring biased ball bearings are positioned to enter the notches at the positions of rotation of said rings corresponding to said shutters being fully open and fully closed.
3. A device in accordance with claim 1 wherein
   said casing sections are pivoted to each other,
   and a freely rotatable pulley is located on the pivot axis,
   said belt means comprising at least two belts, each connected between said pulley and one of said rings.

References Cited by the Examiner

UNITED STATES PATENTS

| 1,770,351 | 7/1930 | Martino | 352—142 |
| 2,242,666 | 5/1941 | Walsh | 95—44 |
| 2,481,082 | 9/1949 | Chew | 95—44 |
| 2,848,924 | 8/1958 | Potez | 88—39 X |

FOREIGN PATENTS

| 551,472 | 1/1958 | Canada. |
| 966,345 | 8/1957 | Germany. |
| 167,443 | 11/1921 | Great Britain. |

DAVID H. RUBIN, *Primary Examiner.*

J. M. GUNTHER, *Assistant Examiner.*